July 29, 1969                    B. PARKER                    3,457,794
WIDE ANGLE ATTITUDE SENSING MEANS
Filed Aug. 16, 1967                                      2 Sheets-Sheet 1

INVENTOR.
BERNARD PARKER
BY
*giarratana & malik*
ATTORNEYS

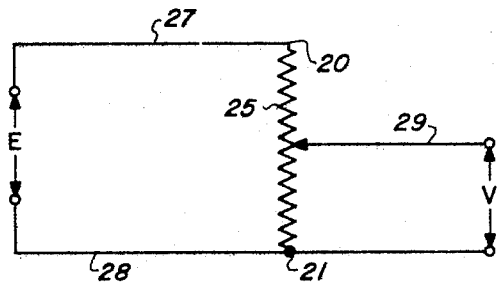
FIG. 4
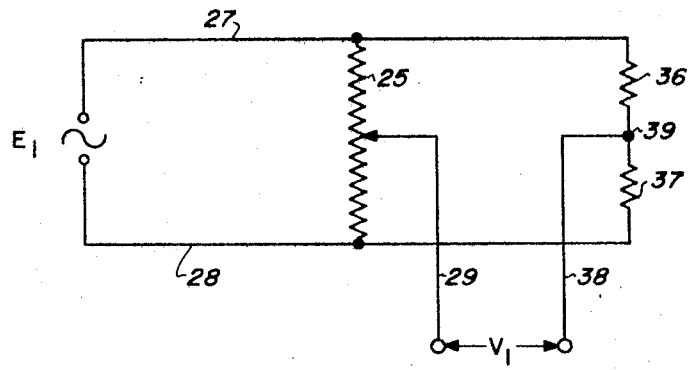
FIG. 5
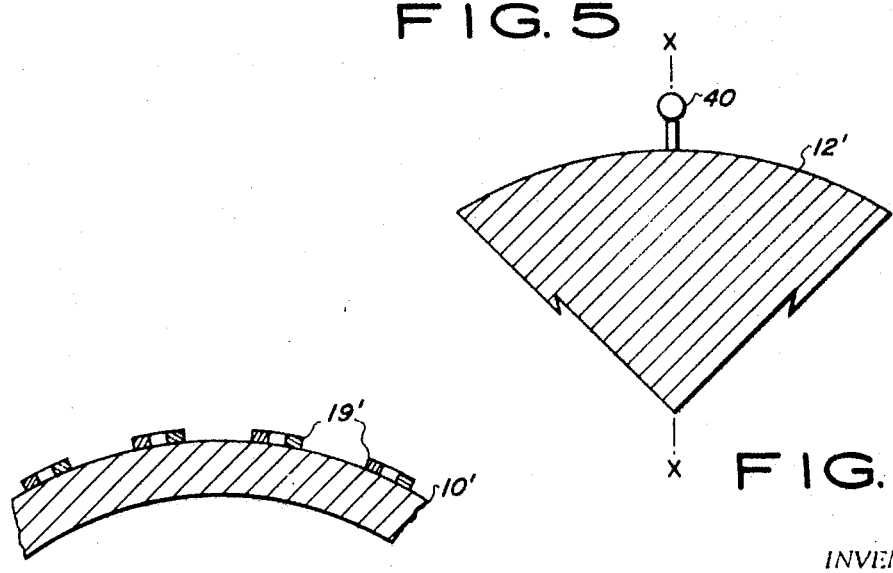
FIG. 6
FIG. 7
INVENTOR.
BERNARD PARKER
BY
ATTORNEYS United States Patent Office 3,457,794
Patented July 29, 1969

3,457,794
WIDE ANGLE ATTITUDE SENSING MEANS
Bernard Parker, Teaneck, N.J., assignor to Singer-General Precision, Inc., Little Falls, N.J., a corporation of Delaware
Filed Aug. 16, 1967, Ser. No. 661,097
Int. Cl. G01c *19/28;* G01d *5/34*
U.S. Cl. 74—5.6        10 Claims

ABSTRACT OF THE DISCLOSURE

A free-rotor gyroscope of the hydrostatic gas bearing type is provided with a wide angle, photopotentiometric pickoff system which provides a single output signal containing two-axis positional information. The photopotentiometric element, which comprises a photoconductive strip sandwiched between an electrically conductive strip and a resistive strip, functions as an ordinary potentiometer except that the wiper arm is replaced by a spot of light. A mechanical wiper arm may also frictionally engage the electrically conductive and resistive strips to produce the desired readout.

BACKGROUND OF THE INVENTION

Field of the invention

This invention relates generally to spatial orientation responsive devices and the like and more particularly to wide angle pickoff means therefor having the capability of supplying two-axis positional information in a single output signal.

Description of the prior art

Heretofore known pickoff systems for attitude sensing devices such as gyroscopes and the like, generally utilize a separate transducer for each axis about which motion is to be sensed. Consequently, the information for a two degree of freedom system, such as pitch and yaw, for example, appears in the form of two separate signals.

In gyroscopes of the type employing gimbal rings, the gyroscope rotor is mounted for rotation on two gimbals having their axes perpendicular to each other. Accordingly, in order to obtain positional information with respect to the rotor spin axis, the angle between each set of gimbals would be sensed by transducer means such as a potentiometer, a synchro or a resolver and converted into an electric output signal. The transducer needed for each of the two axes must be wired through the gimbals which is a costly and time consuming operation. Furthermore, slip rings and bearings must be provided on each axis about which motion is to be sensed to provide for a suitable wide angle output from the pickoff. Additionally, the presence of the gimbals themselves introduce error in the output of the gyroscope because of the mass of the gimbals and because of the possibility of so-called "gimbal locks" which may arise because of certain rapid course alternations of the vehicle in which the gyroscope is mounted.

To avoid the use of gimbal rings, so-called "free rotor" gyroscopes have been developed in which the gyroscope rotor is usually spherical in shape and is supported within a spherical cavity in the gyroscope housing by means such as a hydrostatic or hydrodynamic gas bearing which permits the rotor to spin freely about its spin axis with a minimum of frictional drag on the rotor. The pickoff systems heretofore used for gyroscopes of the free rotor type are generally of the electromagnetic, electrostatic and pneumatic types, all of which suffer from the disadvantage of requiring a separate transducing device for each axis about which motion is to be sensed. Because of the inherent nature of these devices and because of physical size considerations, the angular excursions of the housing reference axis with respect to the rotor spin axis which are capable of being sensed are limited to about ±20°. Furthermore, none of these pickoff systems is capable of supplying a single output signal containing two-axis positional information.

It is also important in many situations to know the position of the rotor spin axis of the gyroscope in terms of spherical coordinates, such as latitude and longitude, for example. Since the foregoing pickoff systems essentially measure the angular position of the rotor spin axis about two, mutually-perpendicular, reference axes, it is difficult and expensive to present this information in terms of a spherical coordinate display.

SUMMARY OF THE INVENTION

It is an object of this invention to provide wide angle attitude sensing means which present two-axis positional information, such as spherical coordinate identification, for example, in a single output signal.

It is a further object of this invention to provide a pickoff system for spatial orientation responsive devices and the like which is operable over an angular range of nearly 360° about two reference axes.

It is a still further object of this invention to provide a wide angle pickoff system which is especially adapted for use with gyroscopes and other attitude sensing devices of the free rotor type, in that the pickoff system is virtually frictionless in operation and does not introduce errors arising from mass or rapid course alterations.

It is another object of this invention to provide a wide angle pickoff system for spatial orientation responsive devices and the like which is of small size and weight, mechanically rugged in construction, and relatively inexpensive to manufacture and maintain.

Briefly, the invention, as applied to an attitude sensing device of the free rotor type having a housing with a cavity formed therein, a spinning rotor disposed within the cavity, and bearing means for supporting the rotor within the cavity to permit angular movement of the rotor spin axis about two, mutually-perpendicular, housing axes, contemplates the disposition of a continuous, multistrip, potentiometer element on a surface of the housing enclosing the cavity in such a manner that each position on the housing surface is uniquely defined by a different point along the length of the element. When the housing surface is spherical in shape, the potentiometer element may be spirally disposed on the surface from one point thereon to the diametrically opposite point thereon, so that the spherical coordinates of each location on the housing surface are uniquely defined by a different point along the length of the element. In the preferred embodiment of the invention, the potentiometer element comprises three abutting strips each extending the length of the element. The first strip is formed of an electrically resistive material, the second strip of an electrically conductive material, and the third strip of a photoconductive material which is disposed between the first and second strips.

When the rotor is provided with means for producing a light beam along the rotor spin axis at one end thereof, a spot of light will be projected on the spherical housing surface at the location where that end of the rotor spin axis intersects the housing surface and will render the photoconductive material electrically conductive at that point, to thereby electrically connect the first and second strips at that point. Since that location on the housing surface is uniquely defined by only one point along the length of the potentiometer element, the setting of the potentiometer and hence the single output signal therefrom will represent both the spherical coordinates of that location on the housing surface and the angular deviation of the rotor spin axis about the two housing axes. By this means, two-axis positional information is supplied in a single output signal.

In practice, the potentiometer element may be disposed directly, on the spherical cavity wall of the housing or, if desired, the housing may be formed of a transparent material and the potentiometer element placed on the outside of the housing. Similarly, in certain applications of the invention, where a low frictional drag on the rotor could be tolerated, the light beam producing means on the rotation therein about the rotor spin axis by a hydrothe photoconductive strip of the potentiometer element dispensed with.

The nature of the invention and other objects and additional advantages thereof will be more readily understood by those skilled in the art after consideration of the following detailed description taken in conjunction with the accompanying drawings.

BRIEF DESCRIPTION OF THE DRAWINGS

In the drawings:

FIG. 4 is the equivalent circuit diagram for the pickoff arrangement shown in FIG. 1 of the drawings, wherein the photopotentiometer element is continuously, spirally disposed about the housing cavity wall from one end of the housing reference axis X—X to the other end thereof;

FIG. 5 is a circuit diagram of a null point-adjustable bridge circuit which may be employed with the pickoff arrangement of the invention;

FIG. 6 is a fragmental, sectional view of a gyroscope rotor showing the substitution of a mechanical wiper arm for the light beam arrangement of FIG. 1 of the drawings and constituting an alternative embodiment of the invention; and FIG. 7 is a fragmental, sectional view of a portion of a gyroscope housing constituting another alternative embodiment of the invention, wherein the housing is fabricated of a transparent material and the photopotentiometer element is spirally disposed about the outside of the housing.

DESCRIPTION OF THE PREFERRED EMBODIMENT OF THE INVENTION

Figure 1:
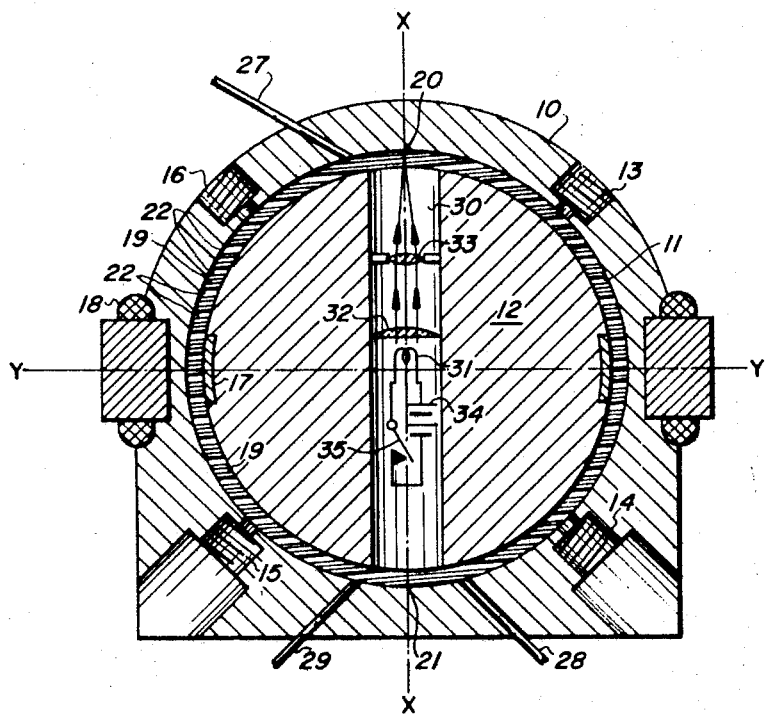
FIG. 1 is a sectional view taken in the X–Y plane of a directional gyroscope of the hydrostatic gas bearing type constructed in accordance with the teachings of the present invention.

Referring now to FIG. 1 of the drawings, there is shown a gyroscope of the hydrostatic gas bearing type comprising a housing 10 having a substantially spherical cavity 11 formed therein. A substantially spherical rotor 12 is disposed within the cavity 11 and is supported for rotation therein about the rotor spin axis by a hydrostatic gas bearing of the type disclosed in U.S. Patent No. 3,187,588 granted to Bernard Parker on June 8, 1965, to which reference is made for specific details of construction. In the view of FIG. 1 of the drawings, four gas bearing inlet ports 13, 14, 15 and 16 are visible and each functions to supply gas under pressure to the housing cavity 11. A plurality of exhaust ports, not shown in this view, are provided to carry off the gas, whereby a virtually frictionless bearing is provided for the rotor 12 in the manner described in the said U.S. Patent No. 3,187,588. The rotor 12 is brought up to a predetermined operating speed by the arrangement shown in FIG. 1 of the drawings as comprising a cylindrical hysterisis ring 17, which is embedded in the surface of rotor 12 along the Y—Y axis, and a three-phase stator winding 18 which is disposed about the gyro housing 10 along the Y—Y axis. As will be understood by those skilled in the art, means, not shown, are customarily provided to "cage" the rotor during the period when it is being brought up to operating speed to cause the rotor to spin about a nominal spin axis. In operation, the hysterisis ring 17 and stator winding 18 function in the manner of a hysterisis motor to cause the rotor 12 to spin about a nominal spin axis which, in the gyroscope illustrated, coincides with the housing reference axis X—X. Upon reaching a predetermined operating speed, the stator winding 18 is deenergized and the rotor 12 is uncaged to thereby permit the rotor to deviate from its nominal spin axis and assume an actual spin axis with reference to the housing 10. In the gyroscope illustrated the spin axis of the rotor is free to rotate about either the Y—Y axis, which may in practice be the pitch axis of the vehicle in which the gyroscope is mounted, or the Z—Z axis, which is not illustrated, but which would be perpendicular to the X-Y plane shown in FIG. 1 of the drawings and which would then correspond to the yaw axis of the vehicle in which the gyroscope is mounted.

Figure 2:
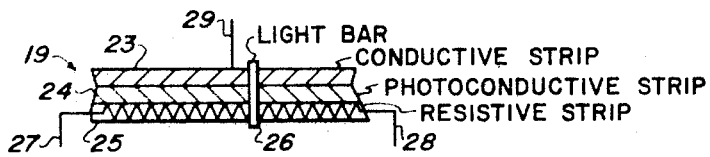
FIG. 2 is a plan view of a portion of the multistrip photopotentiometer element which is spirally disposed about the cavity wall of the housing of the gyroscope of FIG. 1.

In order to sense the angular position of the rotor spin axis about the Y—Y and Z—Z axes of the gyroscope, a novel pickoff arrangement is provided which yields a single output signal containing two-axis positional information. As seen in FIG. 1 of the drawings, a single, multistrip, photopotentiometer element 19 is continuously, spirally disposed about the wall of housing cavity 11 from one end 20 of the housing reference axis X—X to the other end 21 thereof, in such a manner that each position on the cavity wall is uniquely defined by a different point along the length of the element. The adjacent whorls of the photopotentiometer element 19 are electrically insulated from each other by a spiral air gap 22. In FIG. 2 of the drawings, the photopotentiometer element 19 is seen to comprise three abutting strips 23, 24 and 25, each of which extends the full length of the element. Strip 23 is formed of an electrically conductive material, such as silver or gold, for example, while strip 24 is formed of a photoconductive material, such as cadmium selenide or cadmium sulphide, for example. Strip 25 is formed of a material having a high degree of electrical resistivity, such as Nichrome, for example. The three strips are so arranged that the photoconductive strip 24 is "sandwiched" between the conductive strip 23 and the resistive strip 25. The photoconductive material forming strip 24 has selective electrical conducting properties in that it is normally not conductive but becomes electrically conductive when subjected to light radiation. As shown in FIG. 2, for example, when a rectangular light bar 26 is focussed upon the photopotentiometer element 19, the photoconductive material of strip 24 which receives the light radition becomes electrically conductive and connects the conductive strip 23 to the resistive strip 25 at the point along the length of the element at which the light bar strikes all three of the strips. Accordingly, if the ends of the resistive strip 25 are connected to a pair of leads 27 and 28 and the conductive strip is connected to a lead 29, the light bar 26 acts as the wiper arm of a potentiometer and connects lead 29 to that point along the length of the resistive strip at which the light bar is focussed.

Figure 3:
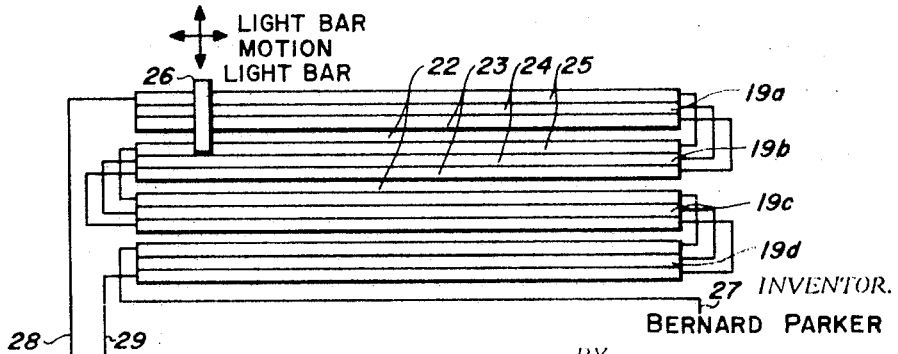
FIG. 3 is a schematic diagram showing the equivalent electrical connections between adjacent whorls of the continuous, spirally-disposed, photopotentiometer element.

As shown in FIG. 1 of the drawings, the leads 27 and 28 which are connected to the ends of the resistive strip 25 are brought out at the opposite ends of the housing reference axis X—X and the lead 29 which is connected to the electrically conductive strip 23 is brought out adjacent the lead 28. The spiral gap 22 between the adjacent whorls of the photopotentiometer element 19 serves to electrically insulate the conductive strip of one whorl from the resistive strip of the adjacent whorl, to thereby prevent short-circuiting of the photopotentiometer element at any point along its length. The equivalent electrical circuit of this arrangement is shown in FIG. 3 of the drawings, wherein 19a, 19b, 19c and 19d represent adjacent whorls of the photopotentiometer element 19 which are separated by the gap 22 and are brought out to the leads 27, 28 and 29 at the exterior of the housing. As seen in this figure, movement of the light bar 26 along the length of the photopotentiometer element 19 will serve to connect the "wiper" lead 29 to the resistive strip 25 at that point along the length of the resistive strip where the light bar strikes the photoconductive strip 24. Accordingly, if the resistive strip 25 between leads 27 and 28 is a linear resistance, i.e., it has a constant resistivity per unit of length, the electrical resistance measured between wiper arm lead 29 and lead 28 at one end of the resistive strip 25 will be directly proportional to the position of the light bar 26 along the length of the photopotentiometer element 19.

Referring again to FIG. 1 of the drawings, it is seen that the substantially spherical rotor 12 is formed with a cylindrical opening or passageway 30 which is concentrically disposed about the spin axis of the rotor and which contains a light source or bulb 31 and a condensing lens system consisting of lenses 32 and 33. The bulb 31 is connected in series-circuit with a voltage source, such as battery 34, and a centrifugal switch 35. When the rotor 12 is brought up to its predetermined operating speed by the hysterisis ring 17 and the stator winding 18, the centrifugal switch 35 will close and the light bulb will be energized by the battery 34. The condensing lens system consisting of lenses 32 and 33, functions to focus the light rays from the light source 31 into a beam of light along the spin axis of the rotor, so that a light "spot" will be projected on the housing cavity wall at the point of intersection of the rotor spin axis with the cavity wall. For example, with the spin axis of the rotor 12 in the position shown in FIG. 1 of the drawings, wherein the spin axis is coincident with the housing reference axis X—X, the light spot would be focussed at point 20 on the wall of the cavity 11. In practice, the light spot should be of sufficient width to bridge the distance between conductive strip 23 and resistive strip 25 to thereby render the photoconductive material of strip 24 completely conductive at the point where the light spot is focussed. However, the width of the light spot should not be so large as to cause the spot to impinge upon the photoconductivee strips of the adjacent whorls of the photopotentiometer element 19, because a spurious output signal will then be produced.

In operation, as the housing reference axis X—X of the gyroscope 10 deviates from the position of the spin axis of rotor 12, the light beam which is aligned with the spin axis of the rotor will cause a spot of light to be projected at some location on the wall of housing cavity 11. This light spot will electrically connect the conductive strip 23 to the resistive strip 25 at that point along the length of the photopotentiometer element 19 which represents that particular location on the housing cavity wall. Since the photopotentiometer element 19 is a single, continuous "ribbon" or strip which is spirally disposed about the housing cavity wall, each point along the length of the strip uniquely defines a location on the sphere defined by the cavity and consequently represents a set of spherical coordinates for that location. Furthermore, since each point along the length of the element 19 represents a different resistance value or "setting" of the potentiometer, each set of spherical coordinates of the cavity sphere is defined by a different potentiometer "setting." Accordingly, the output signal from the photopotentiometer arrangement represents the spherical coordinates of the location on the housing cavity sphere where the light spot is focussed. Similarly, the location of the light spot upon the cavity sphere also serves to define a unique set of angular positions of the rotor spin axis about Y—Y and Z—Z axes of the housing. In the illustrated embodiment of the invention, if the X—X axis of the gyroscope is coincident with the roll axis of the airplane or guided missile in which the gyroscope is mounted, the output resistance measured between the wiper lead 29 and one of the resistive leads 27 or 28 will then represent both a particular yaw axis deviation and a particular pitch axis deviation of the vehicle in which the gyroscope is mounted.

In order to better understand the operation of the novel pickoff means of the invention, reference is made to FIG. 4 of the drawings, wherein the equivalent electric circuit for the photopotentiometer configuration shown in FIG. 1 of the drawings is illustrated. As seen in FIG. 4, lead 27 which is connected to the resistive strip 25 at point 20 of the housing cavity sphere and lead 28 which is connected to the other end of the resistive strip at point 21 on the housing cavity sphere are connected across a substantially constant voltage source E, which may be either alternating current or direct current, to produce an output voltage V between wiper lead 29 and the end 21 of the resistive strip 25. When the rotor spin axis is coincident with the housing reference axis X—X, the light spot from light source 31 will strike the housing cavity wall at point 20 and the wiper lead 29 will be directly connected to the resistive strip 25 at that point, so that the output voltage V will be equal to the applied voltage E. If the vehicle in which the gyroscope is mounted does a complete 180° turn in yaw and a 180° turn in pitch, the light spot would be focussed on point 21 of the housing cavity wall and the output voltage V will become zero. For intermediate positions of the rotor spin axis in yaw and pitch, the wiper 29 of the photopotentiometer arrangement as shown in FIG. 4 of the drawings will be set somewhere between the ends 20 and 21 of the resistive strip.

In the circuit shown in FIG. 5 of the drawings, the resistive strip 25 of photopotentiometer element 19 is connected in a bridge circuit with a pair of resistances 36 and 37 and the bridge circuit is energized by a voltage source $E_1$. The resistances 36 and 37 act as trimming resistances to adjust the null point of the pickoff system output voltage $V_1$ which appears between leads 29 and 38 which are respectively connected to the conductive strip 23 and to the circuit junction 39 of the trimming resistances. The output voltage $V_1$ of the circuit will be of reversible polarity or reversible phase depending upon whether source voltage $E_1$ is direct current or alternating current. By virtue of this arrangement, the magnitude of the output voltage $V_1$ indicates the magnitude of the deviation of the gyroscope housing from a reference setting and the polarity or phase of the voltage indicates the direction of the deviation.

It is believed to be apparent from the foregoing description that the output voltage of the novel pickoff means of the invention will provide two-axis positional information with respect to the spatial orientation of the gyroscope housing 10. This information may take the form of a pair of spherical coordinates, such as latitude and longitude, for example, or may take the form of a pair of angular deviations, such as pitch and yaw, for example. The accuracy of the positional information provided by the pickoff is only limited by the physical size of the photopotentiometer element 19 and by the accuracy and closeness of spacing of the whorls of that element on the housing cavity wall. In practice, the housing cavity wall may be fabricated from an electrical insulating material and the photopotentiometer element may be deposited on the cavity wall by any convenient means, such as by vacuum deposition, for example, so that the thickness of the deposited element is extremely small and does not interfere in any way with the hydrostatic gas bearing operation of the gyroscope illustrated It is also believed apparent that the pickoff means of the invention could be used in other types of gyroscopes, such as those having, for example, hydrodynamic, electrostatic or even ball bearings, provided however that the ball bearings are formed of a non-electrically conducting material. Additionally, if desired, the gap 22 between the adjacent whorls of the potentiometer element 19 could be filled with a suitable non-electrically conductive material to render the surface of the cavity completely smooth.

FIG. 6 of the drawings illustrates an alternative embodiment of the invention wherein the gyroscope rotor 12' is of substantially solid construction and is provided with a mechanical wiper arm 40 which is in the shape of a small ball, as illustrated. In operation, this embodiment of the invention functions in substantially the same manner as the photopotentiometer arrangement utilized in FIG. 1 of the drawings, except that the photoconductive strip 24 may be omitted from the potentiometer element 19 because the wiper ball 40 acts to mechanically bridge the insulating gap between the conductive strip 23 and the resistive strip 25. Although this embodiment of the invention will also provide accurate, two-axis positional information in a single output signal, it will impose a slight frictional drag on the rotor of the gyroscope and for that reason the embodiment of FIG. 1 of the drawings is preferred.

Another alternative embodiment of the invention is shown in FIG. 7 of the drawings, wherein the gyroscope housing comprises a hollow, spherical shell 10' fabricated from a transparent, non-electrically conductive material, such as a high-impact plastic, for example. The photopotentiometer element 19' may then be spirally disposed on the outside of the housing, so that the light beam from the rotor of the gyroscope will pass through the housing wall and impinge upon the element. The operation and accuracy of this embodiment of the invention would in all respects be the same as the preferred embodiment illustrated in FIG. 1 of the drawings. It may be noted however, that this arrangement would readily lend itself to a spherical coordinate presentation, such as latitude and longitude, for example.

It is believed apparent that many changes could be made in the construction and described uses of the foregoing wide angle pickoff system and many seemingly different embodiments of the invention could be constructed without departing from the scope thereof. For example, it is believed obvious that the pickoff system of the invention is not limited to use in directional gyroscopes, such as the gyroscope illustrated, but may be employed in other spatial orientation responsive devices such as rate gyroscopes, angular accelerometers or inertial platforms, for example. Accordingly, it is intended that all matter contained in the above description or shown in the accompanying drawings shall be interpreted as illustrative and not in a limiting sense.

What is claimed is:

1. Wide angle pickoff means providing two-axis positional information in a single output signal for spatial orientation responsive devices and the like of the type having a housing with a cavity formed therein, a spinning rotor disposed within said cavity, and bearing means for supporting the spinning rotor within the cavity to permit angular movement of the spin axis of the rotor about two, mutually-perpendicular housing axes, said pickoff means comprising a continuous, multistrip potentiometer element mounted on a surface of the housing enclosing the cavity and having a transverse cross-section at each point along the length thereof comprising a first strip of electrically conductive material, a second strip of electrically resistive material, and a third strip of normally non-conductive material separating said first and second strips, said potentiometer element being so disposed on said housing surface that each position on the housing surface is uniquely defined by a different point along the length of the potentiometer element; and wiper means mounted on the rotor along the spin axis thereof for electrically connecting the said first and second strips of the potentiometer element at that one point along the length of the element where the said housing surface is intersected by one end of the rotor spin axis, so that the resistance between said one point and one of the ends of the potentiometer element represents the angular position of the rotor spin axis about both of said housing axes and thereby provides two-axis positional information in a single output parameter.

2. Wide angle pickoff means as claimed in claim 1, wherein the rotor, the housing cavity, and the said housing surface are substantially spherical in shape and the said potentiometer element is spirally disposed about the said housing surface from one point thereon to the diametrically opposite point thereon.

3. Wide angle pickoff means as claimed in claim 2, wherein said wiper means comprises a mechanical wiper arm of electrically conductive material mounted on the rotor at the spin axis pole thereof adjacent the said one end of the spin axis and in frictional engagement with the first and second strips of said potentiometer element.

4. Wide angle pickoff means as claimed in claim 2, wherein the said third strip of the potentiometer element is formed of a photoconductive material, and said wiper means comprises means for producing a beam of light along the rotor spin axis at the said one end thereof of sufficient width to bridge the said first and second strips of the potentiometer element.

5. Wide angle pickoff means as claimed in claim 4, wherein the said housing surface upon which the potentiometer element is spirally disposed is the inner surface of the housing forming the cavity wall.

6. Wide angle pickoff means as claimed in claim 4, wherein the housing is formed of a transparent material and the said housing surface upon which the potentiometer element is spirally disposed is the outer surface of the housing.

7. Wide angle pickoff means as claimed in claim 4, wherein the said housing surface is formed of an electrical insulating material and the said potentiometer element is formed thereon by vacuum deposition.

8. Wide angle pickoff means as claimed in claim 4, wherein the rotor is provided with a substantially cylindrical passageway concentrically disposed about the rotor spin axis, and said light beam producing means comprises an electrically operable light source and centrifugal switch means disposed in said passageway, said switch means being operable to energize said light source when the rotor is brought up to operating speed, to thereby prevent the generation of spurious output signals from the pickoff means during the starting period.

9. Wide angle pickoff means as claimed in claim 4, further comprising a pair of serially-coupled trimming resistances and means for coupling said serially-coupled resistances in parallel-circuit with said second strip of the potentiometer element across a substantially constant voltage source, to thereby form a null point-adjustable bridge circuit output for the pickoff means between the said first strip of the potentiometer element and the circuit junction point of the serially-coupled resistances.

10. Wide angle attitude sensing means adapted to provide two-axis positional information in a single output signal comprising a housing adapted to be mounted in an aircraft or the like, said housing having a substantially spherical cavity formed therein with at least the wall of the cavity being formed of an electrical insulating material; a single, multistrip, photopotentiometer element mounted on the cavity wall in a continuous spiral from one point on the wall to the diametrically opposite point thereon, so that each position on the cavity wall is uniquely defined by a different point along the length of the element, said photopotentiometer element comprising three abutting strips each extending the length of the element, the first strip being formed of an electrically resistive material and having the ends thereof adapted to be coupled to a substantially constant voltage source, the second strip being formed of an electrically conductive material and having one end thereof adapted to form an output for the sensing means, and the third strip being formed of a photo-conductive material and being disposed between said first and second strips, whereby the said one end of the second strip is adapted to be electrically connected to any point along the length of the first strip by directing a beam of light at the point sufficient to render the photoconductive material electrically conductive at that point; a substantially spherical rotor disposed within said cavity, said rotor being adapted to be spun about a spin axis passing therethrough and being formed with a substantially cylindrical passageway disposed concentrically with respect to the spin axis thereof; means associated with said housing for caging, uncaging and bringing said rotor up to a predetermined operating speed; gas bearing means associated with said housing for supporting the spinning rotor within said cavity to permit angular movement of the spin axis of the rotor about two, mutually-perpendicular, housing axes; and means responsive to the rotor spin speed and disposed within the rotor passageway for producing a beam of light along the rotor spin axis at one end thereof when the rotor reaches said predetermined operating speed, to thereby produce a spot of light on the cavity wall at the position thereon intersected by said one end of the rotor spin axis, whereby the sensing means is adapted to produce an output voltage between the said one end of the second strip and one of the ends of the first strip which uniquely represents the angular position of the rotor spin axis about both of said housing axes and consequently is adapted to provide two-axis positional information in a single output signal.

References Cited
UNITED STATES PATENTS

| | | | |
|---|---|---|---|
| 3,239,673 | 3/1966 | Unruh | 250—203 |
| 3,270,567 | 9/1966 | Crampton | 74—5.6 |
| 3,313,161 | 4/1967 | Nordsleck | 74—5.6 |
| 3,328,595 | 6/1967 | Todd | 74—5.6 XR |
| 3,355,953 | 12/1967 | Johnson | 74—5 |
| 3,379,889 | 4/1968 | Barnett et al. | 250—203 XR |

MILTON KAUFMAN, Primary Examiner

MANUEL ANTONAKAS, Assistant Examiner

U.S. Cl. X.R.

250—231